M. J. MILMOE.
BOX LABELING MACHINE.
APPLICATION FILED AUG. 10, 1912.

1,091,688.

Patented Mar. 31, 1914.
12 SHEETS—SHEET 1.

Witnesses:

Inventor:
Michael J. Milmoe
by Lithicum Bell & Fuller
Attys

M. J. MILMOE.
BOX LABELING MACHINE.
APPLICATION FILED AUG. 10, 1912.

1,091,688.

Patented Mar. 31, 1914.
12 SHEETS—SHEET 2.

Witnesses:

Inventor:
Michael J. Milmoe
by Linthicum, Belt & Fuller
Attys.

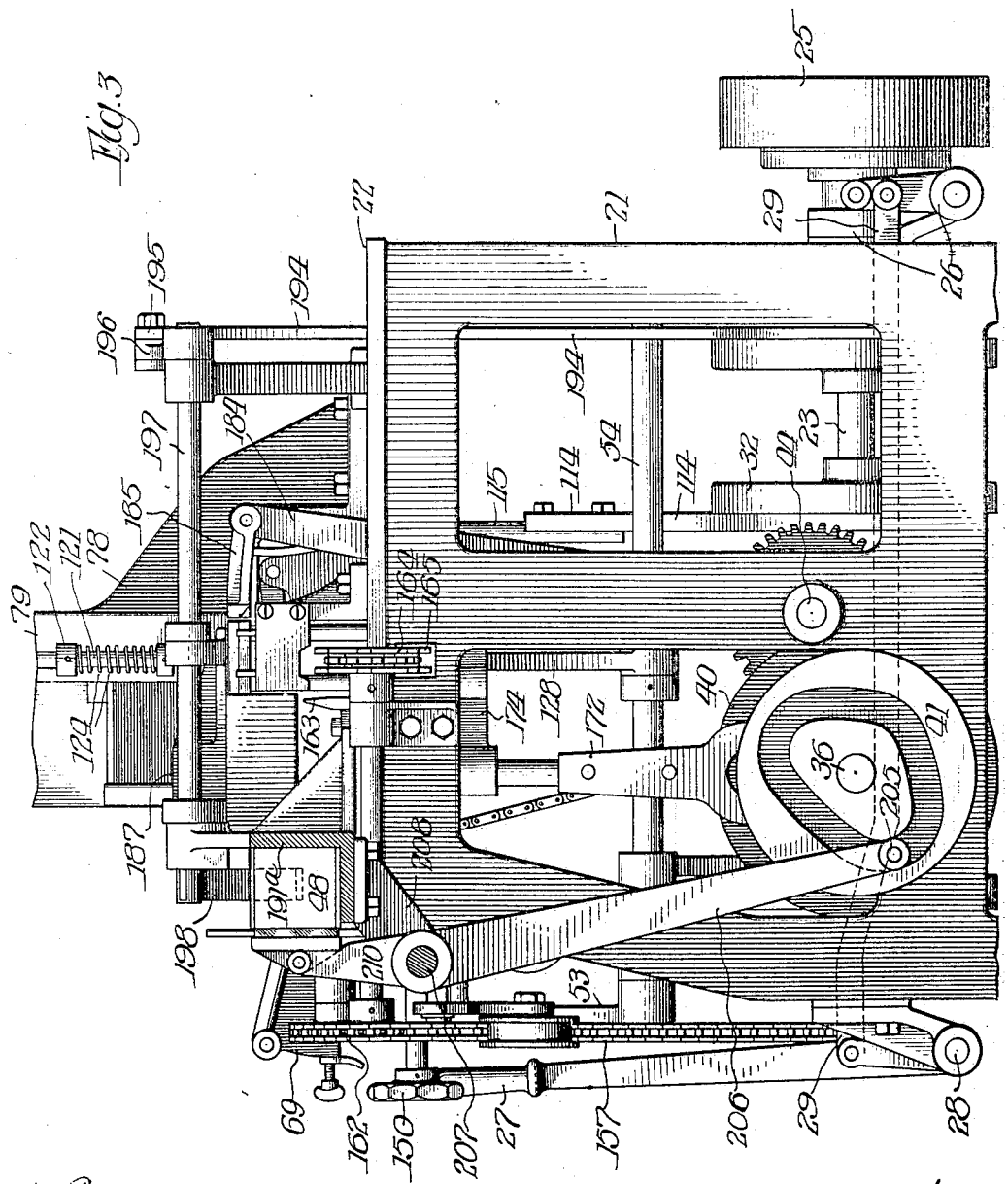

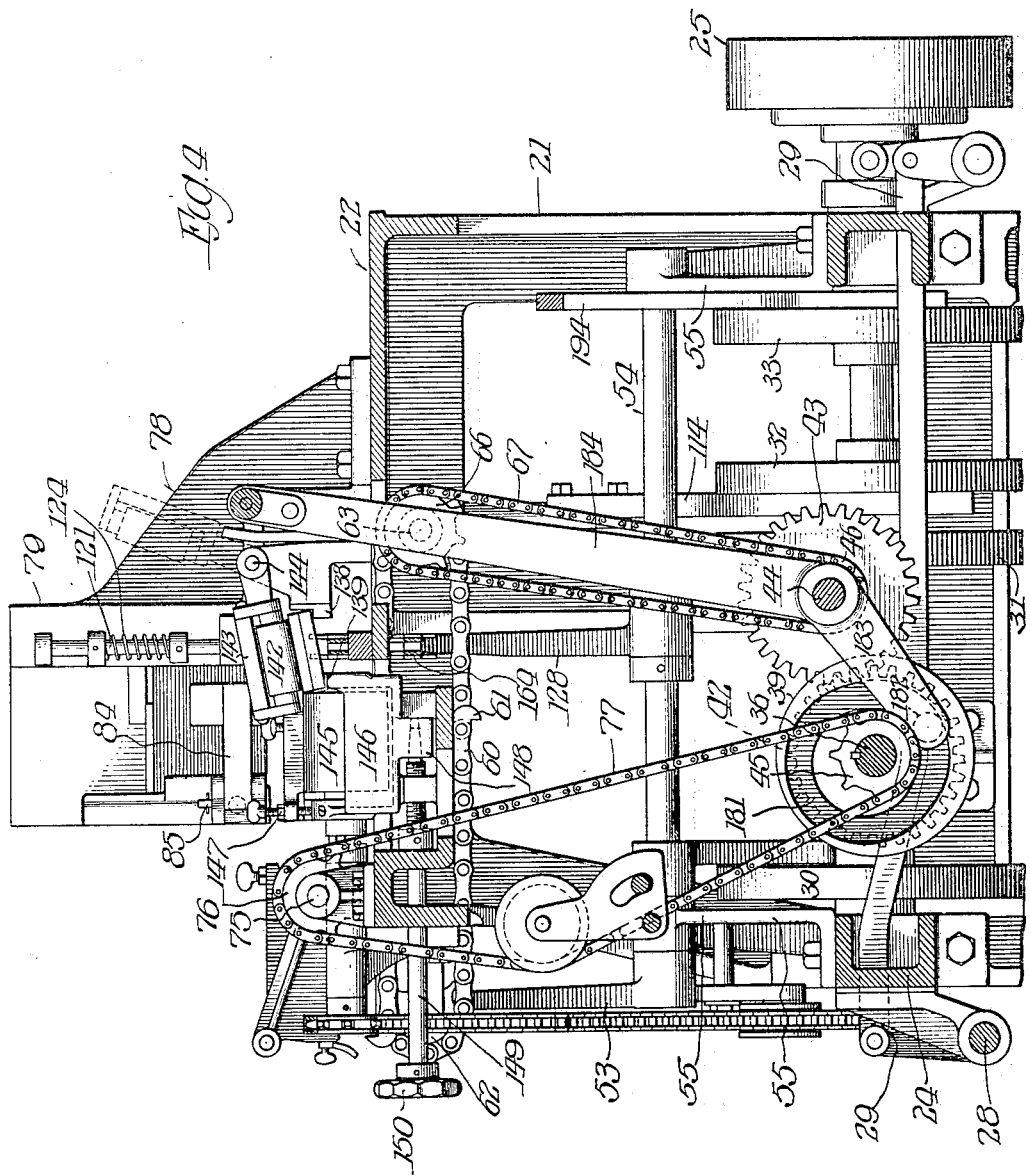

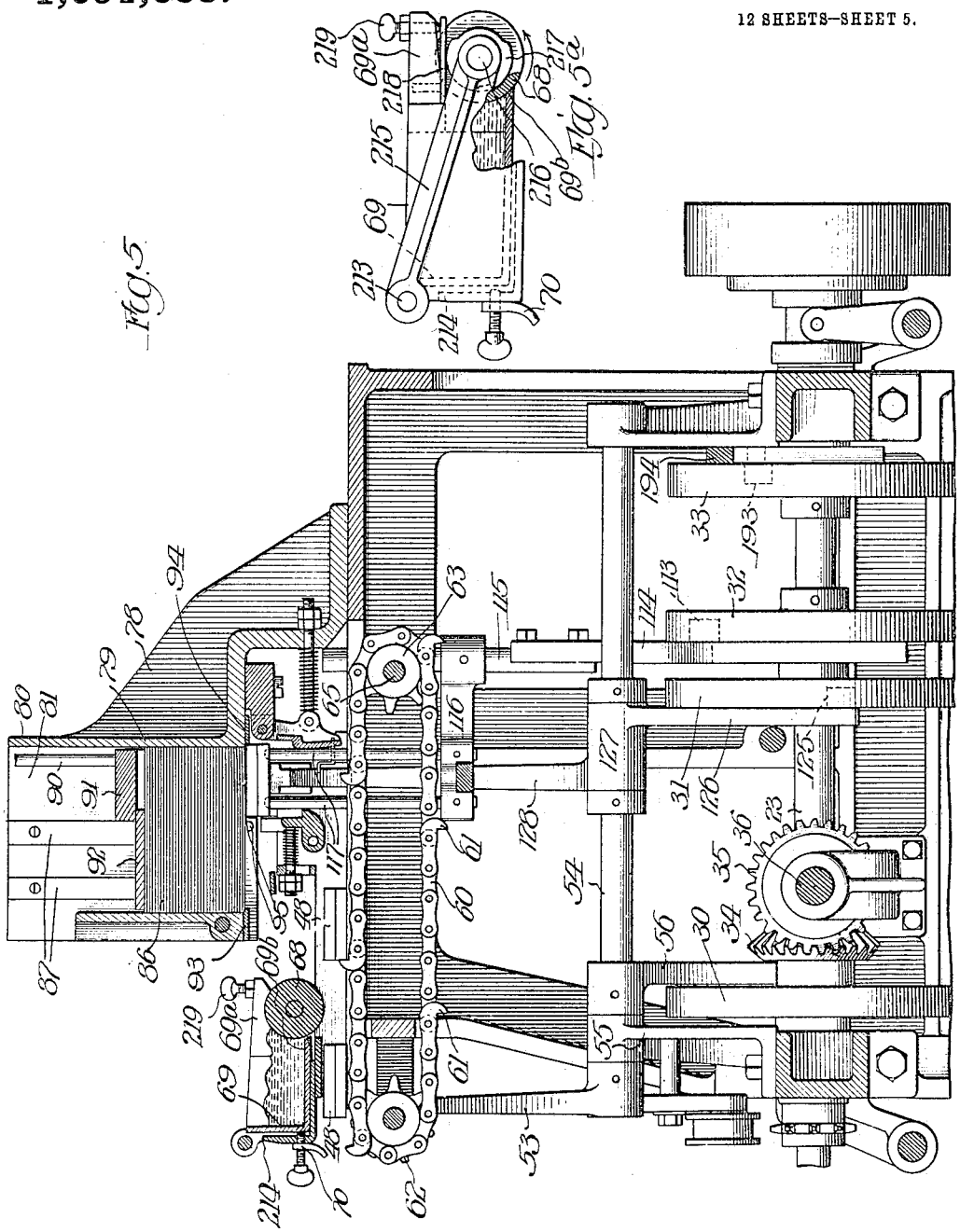

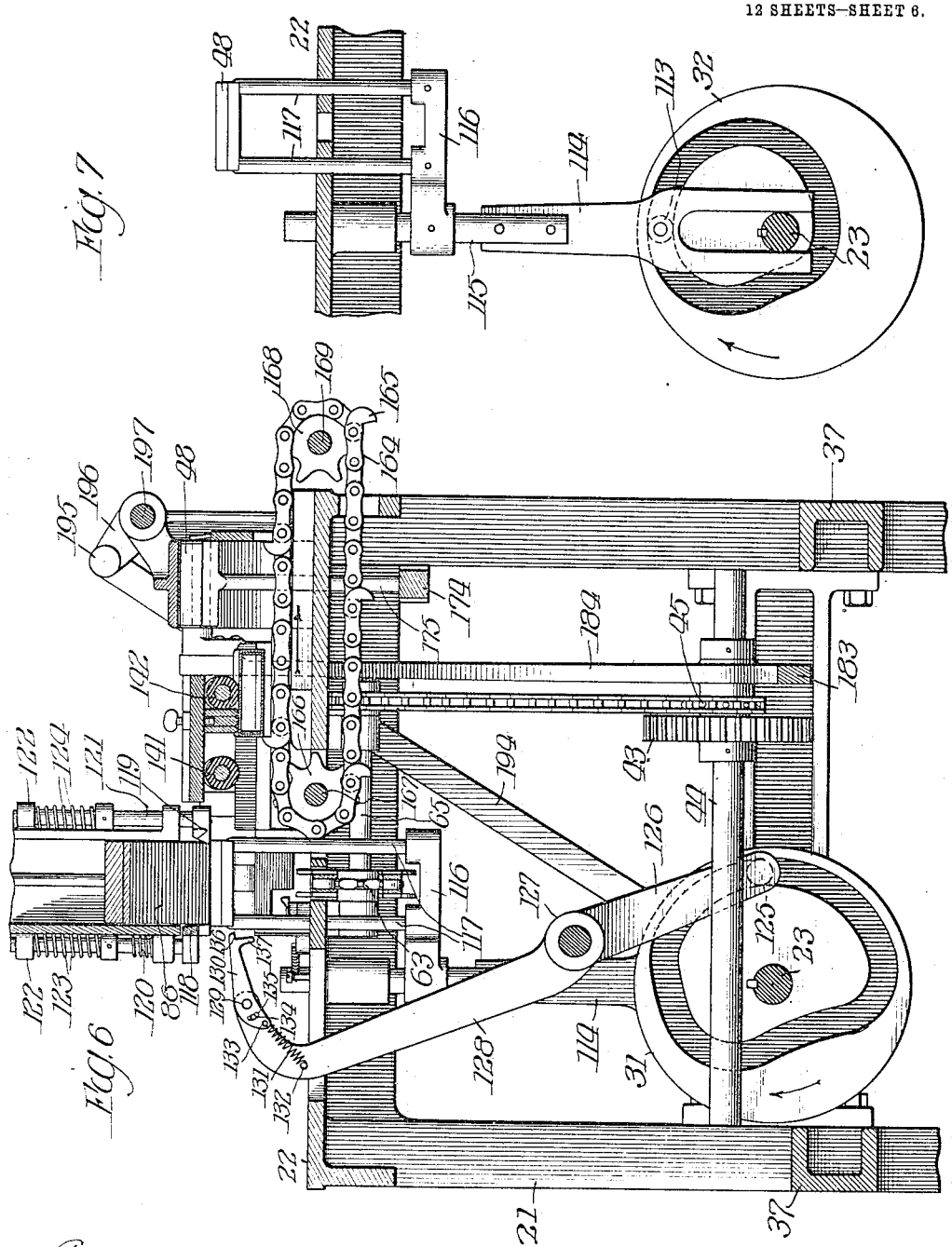

M. J. MILMOE.
BOX LABELING MACHINE.
APPLICATION FILED AUG. 10, 1912.
1,091,688.
Patented Mar. 31, 1914.
12 SHEETS—SHEET 7.
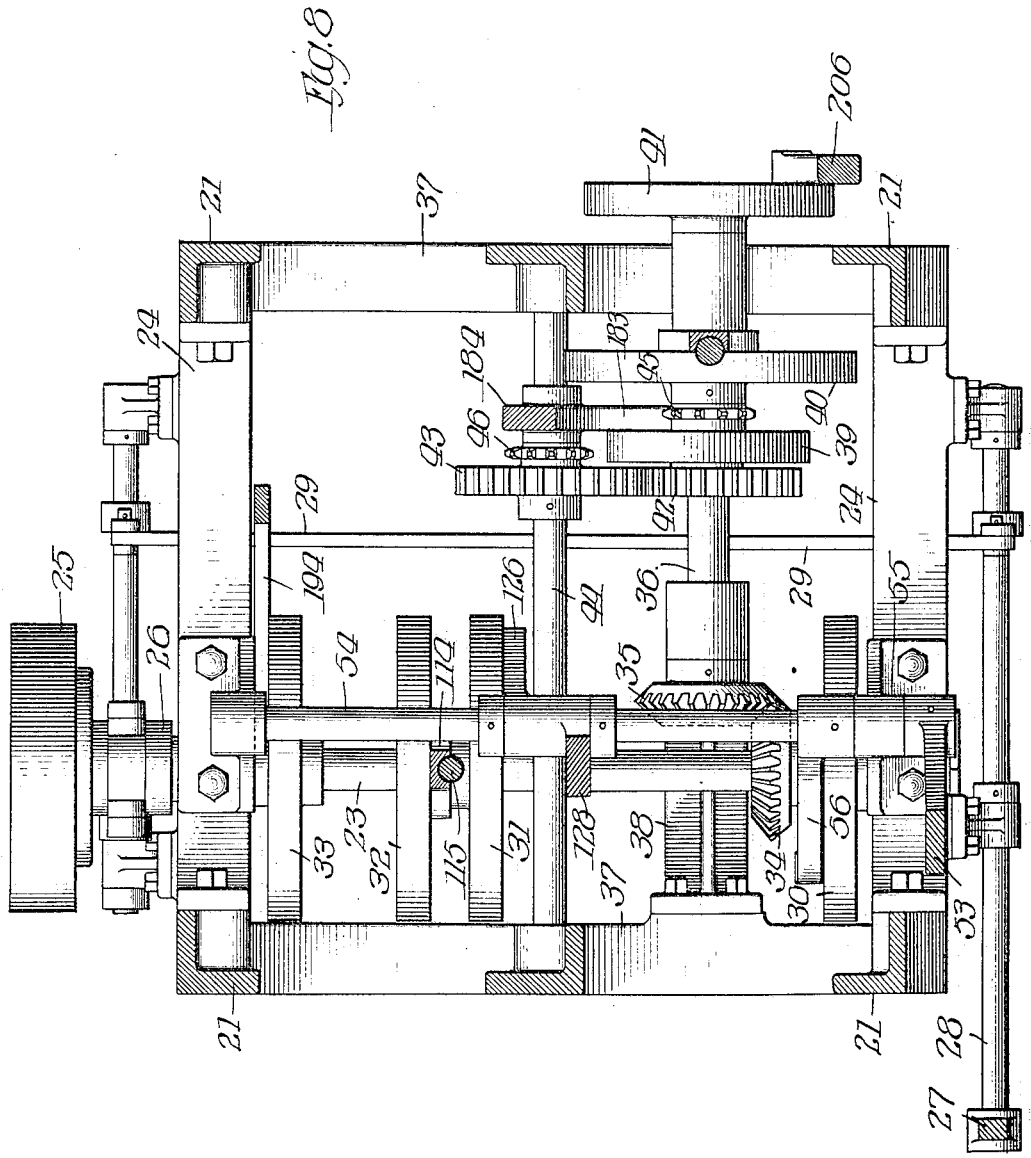

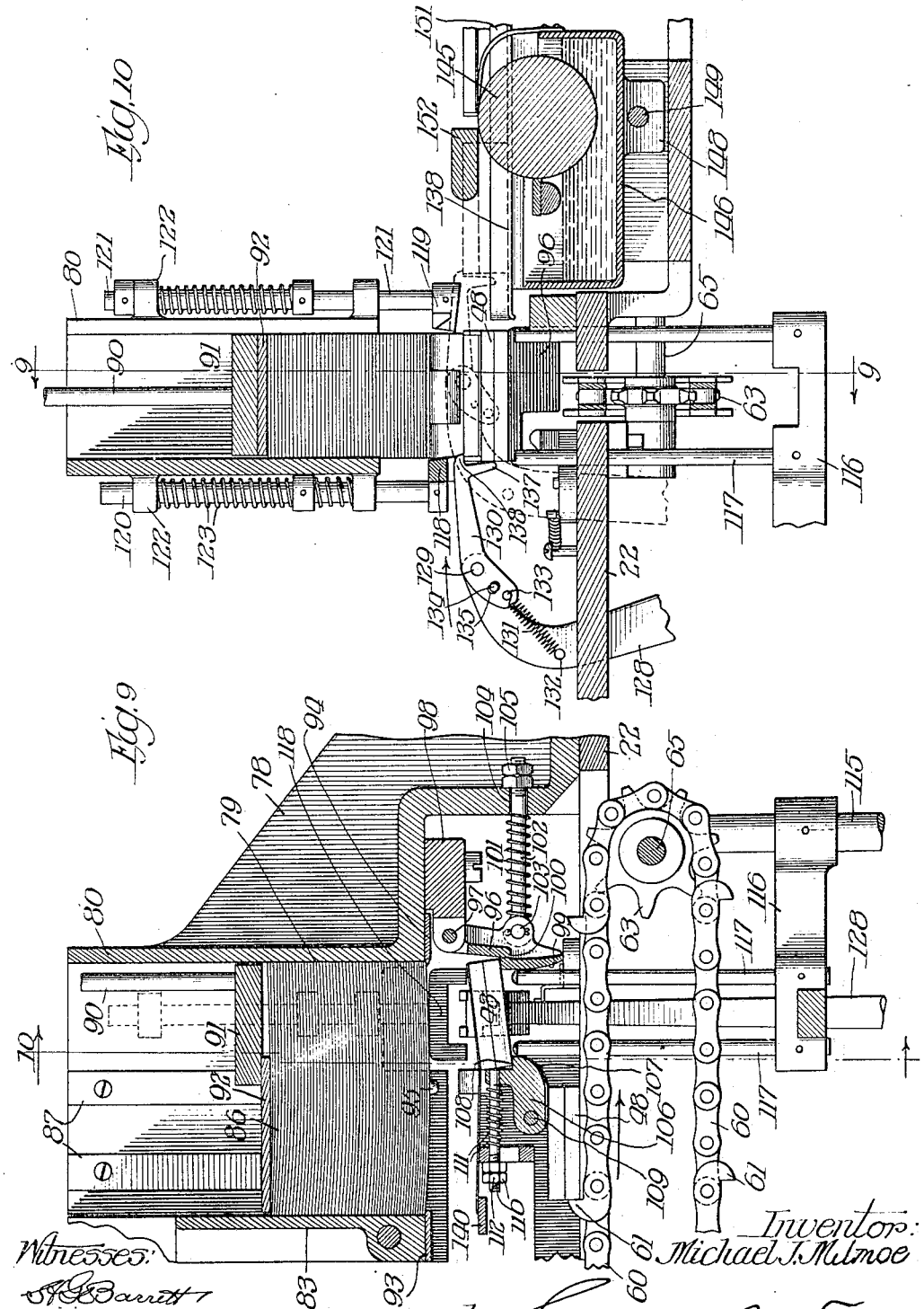

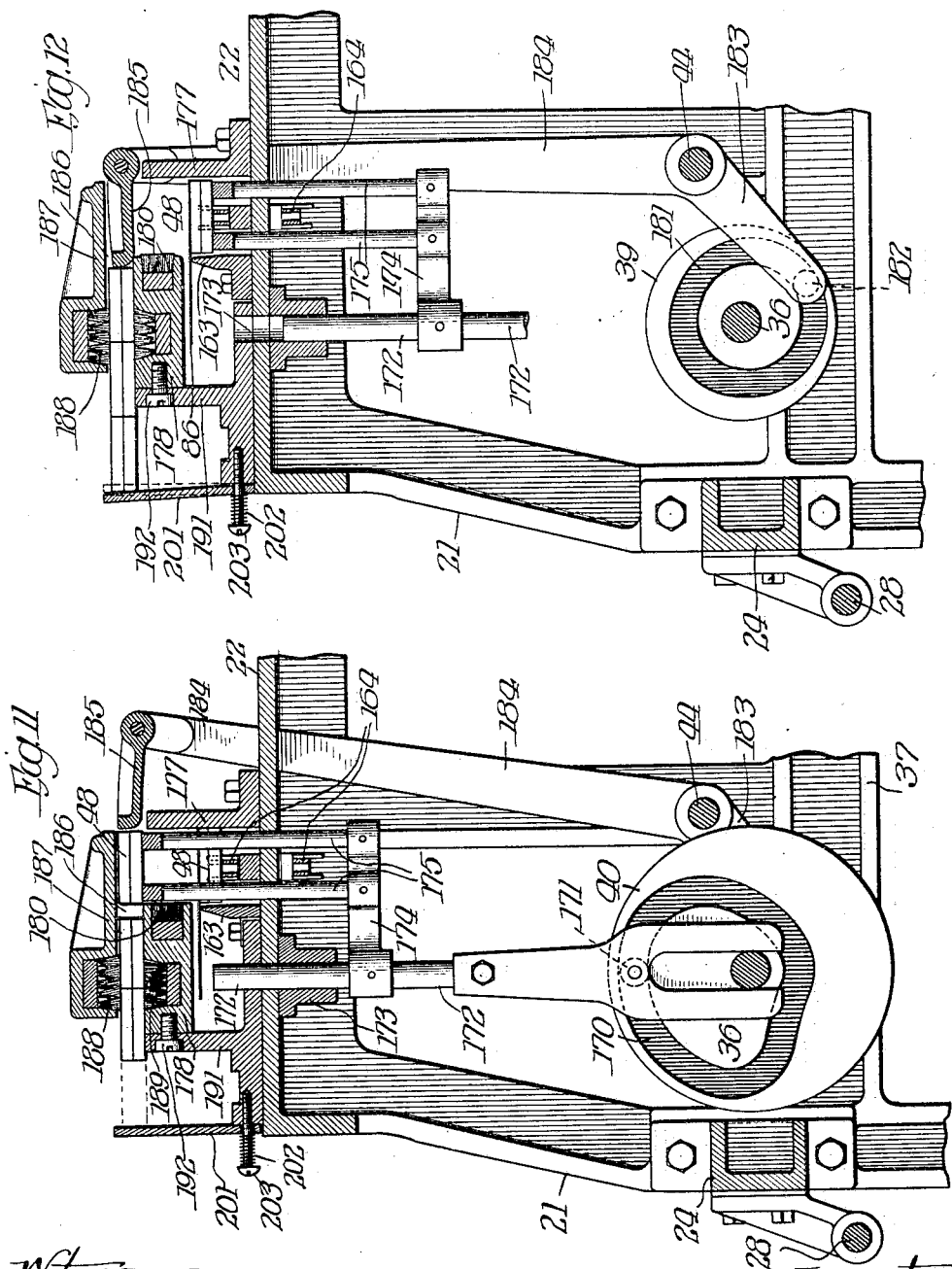

M. J. MILMOE.
BOX LABELING MACHINE.
APPLICATION FILED AUG. 10, 1912.
1,091,688.
Patented Mar. 31, 1914.
12 SHEETS—SHEET 10.
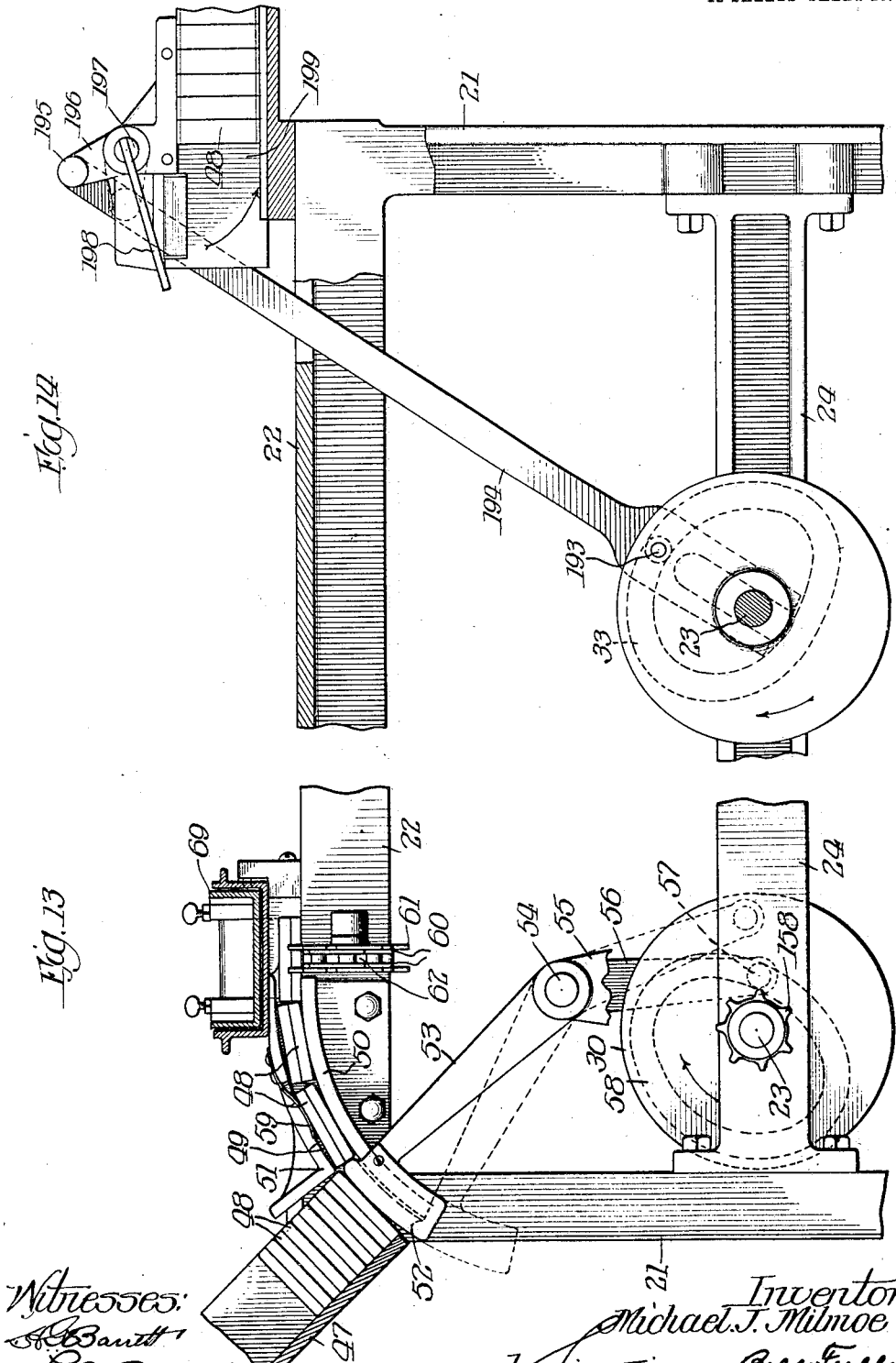

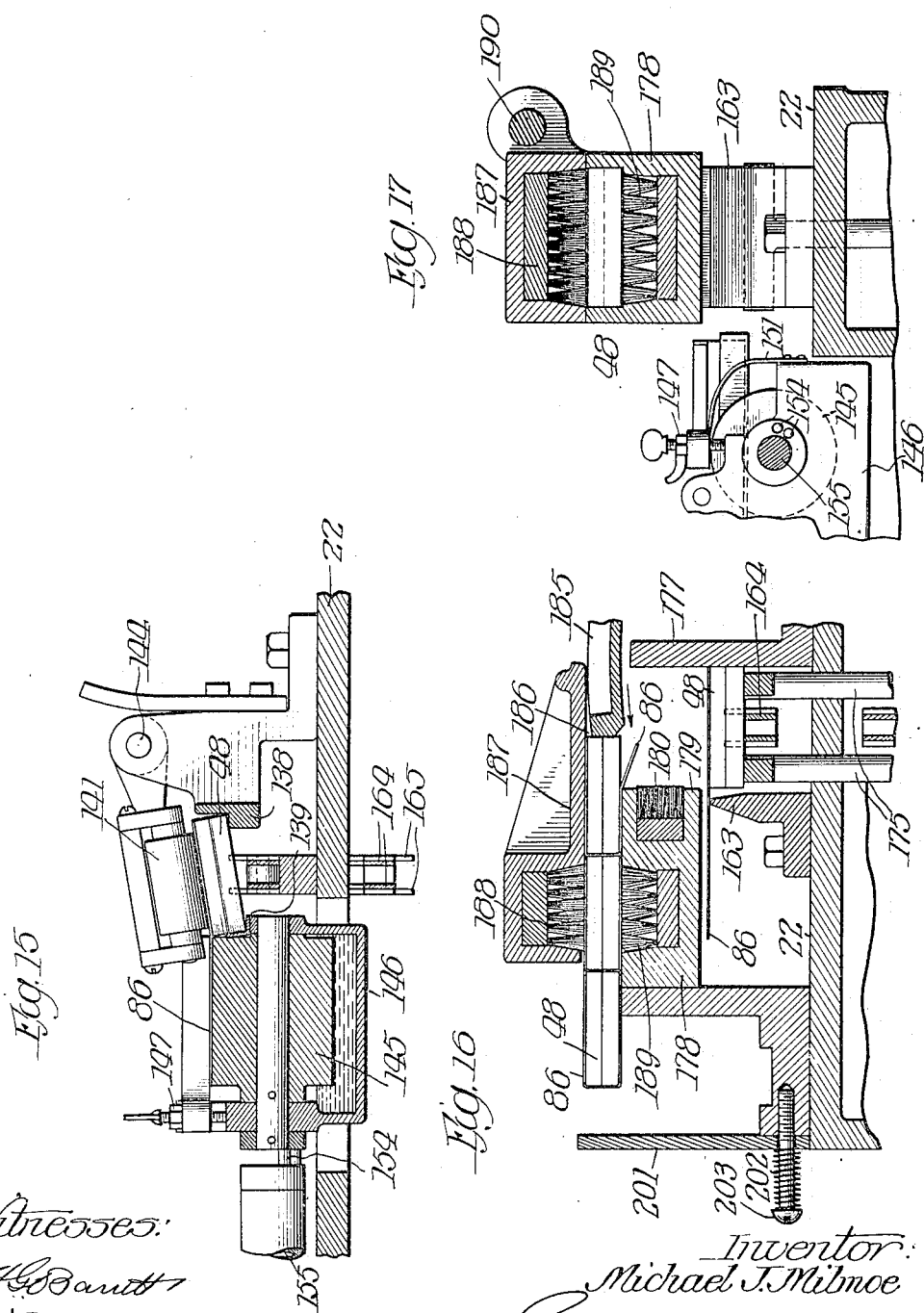

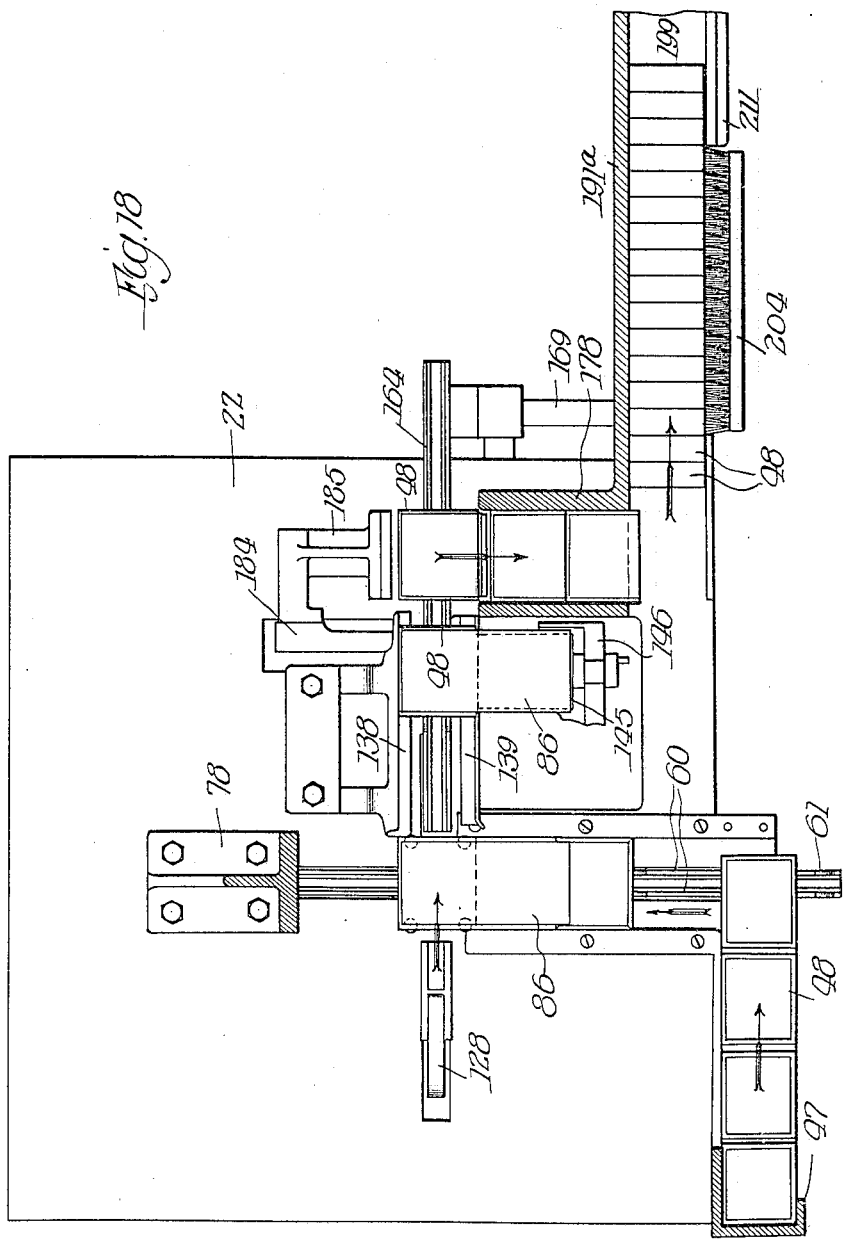

UNITED STATES PATENT OFFICE.

MICHAEL J. MILMOE, OF CHICAGO, ILLINOIS, ASSIGNOR TO W. C. RITCHIE & COMPANY, OF CHICAGO, ILLINOIS, A CORPORATION OF ILLINOIS.

BOX-LABELING MACHINE.

1,091,688.  Specification of Letters Patent.  Patented Mar. 31, 1914.

Application filed August 10, 1912. Serial No. 714,329.

*To all whom it may concern:*

Be it known that I, MICHAEL J. MILMOE, a citizen of the United States, residing at Chicago, in the county of Cook and State of Illinois, have invented certain new and useful Improvements in Box-Labeling Machines, of which the following is a specification.

My invention pertains to the art of applying covering paper or other sheet fabric to containers adapted for the storing and vending of merchantable commodities, and more particularly the invention relates to the application of paper labels to paste board boxes, such as cigarette boxes, wherein the label surrounds three sides of the box and forms at one corner a hinged connection between the box body and cover.

The object of the invention is the provision of improved means for automatically assembling the boxes and labels in proper relation and affixing the label to the box in a most expeditious, neat and secure manner.

The invention, for the purpose of a thorough and complete understanding of the same, will be now described in detail in connection with the accompanying drawings illustrating a preferred practical embodiment of the same.

Figure 1:
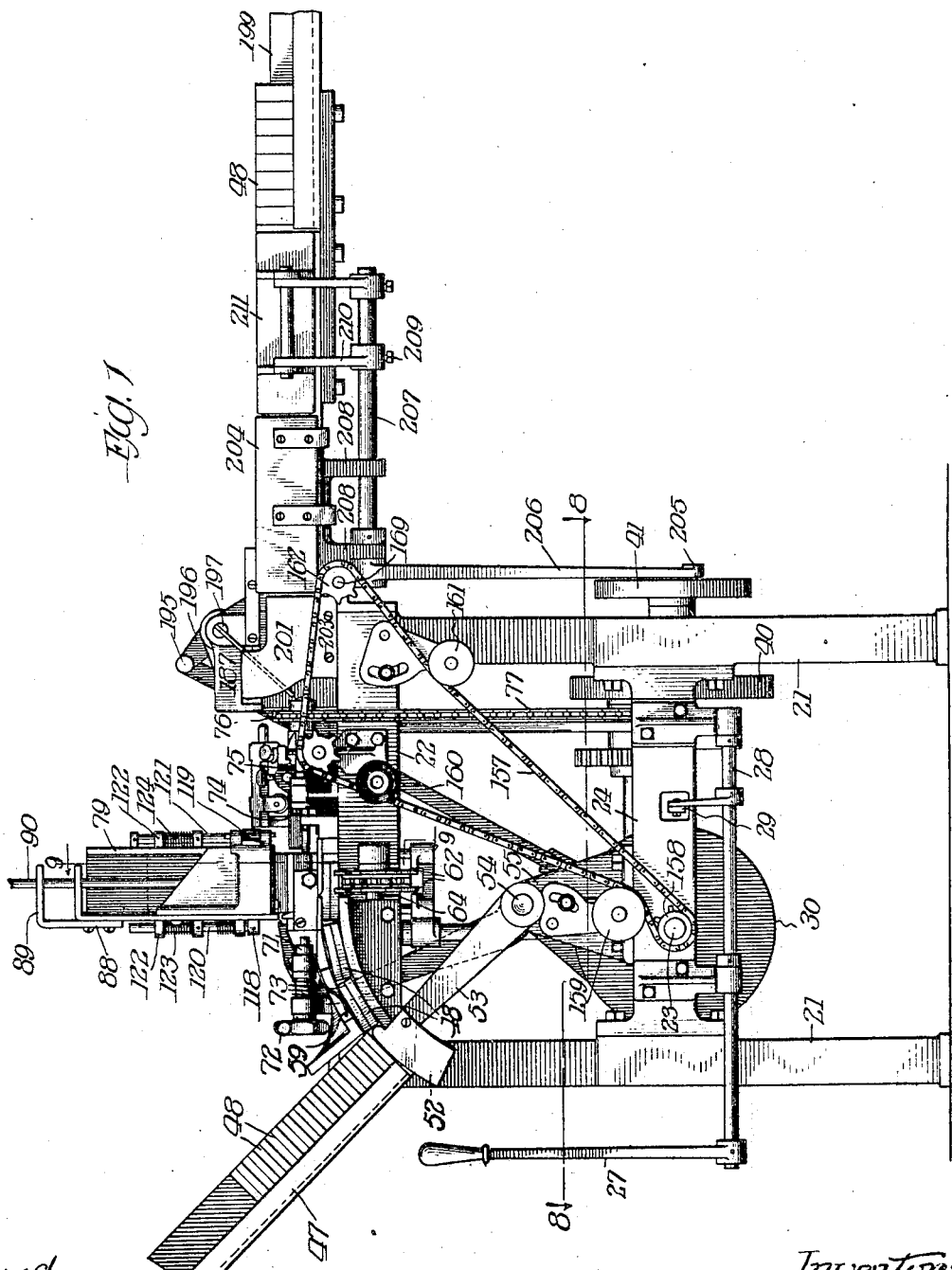
Figure 2:
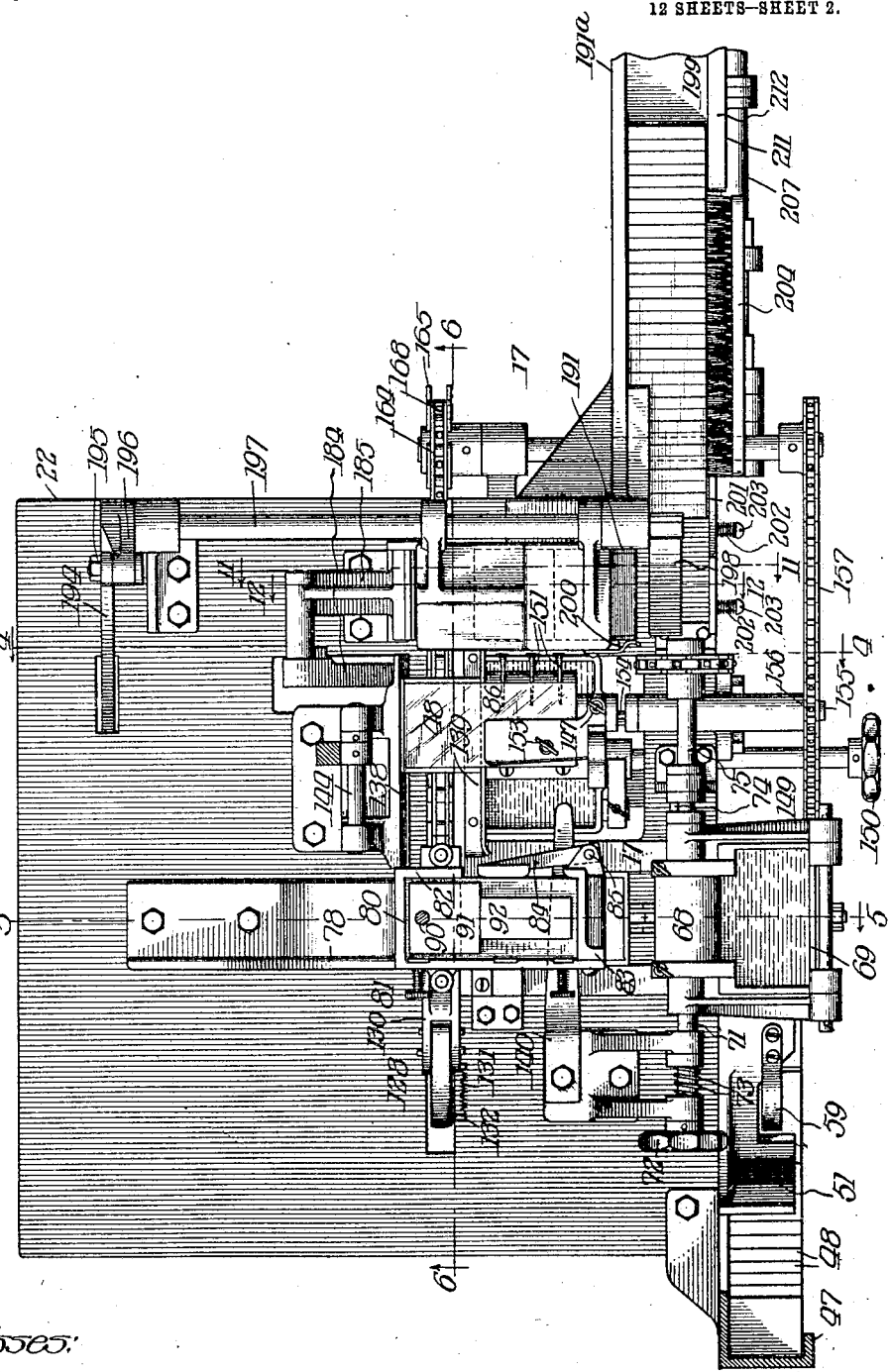

In the drawings Figure 1 is a side elevation of the machine; Fig. 2 is a top plan view; Fig. 3 is a rear end elevation; Fig. 4 is a vertical section on the line 4—4 of Fig. 2; Fig. 5 is a similar section on the line 5—5 of Fig. 2; Fig. 5ª is an enlarged detail of the glue feed; Fig. 6 is a vertical section on the line 6—6 of Fig. 2; Fig. 7 is a detail of one of the operating cams and connections; Fig. 8 is a horizontal section on the line 8—8 of Fig. 1; Fig. 9 is a vertical section on the line 9—9 of Fig. 1; Fig. 10 is a similar section on the line 10—10 of Fig. 9; Fig. 11 is a similar section on the line 11—11 of Fig. 2; Fig. 12 is a similar section on the line 12—12 of Fig. 2; Fig. 13 is a detail view of the box feeding mechanism; Fig. 14 is a detail view of the box-discharge operating mechanism with adjacent parts removed; Figs. 15, 16 and 17 are detail vertical sections through the paste applying, label affixing and smoothing devices by which the label is applied to the edge and bottom of the box, and Fig. 18 is a schematic plan view showing the course of the boxes through the machine and indicating the several operations of the machine in the order of their performance.

Having particular reference to the drawings wherein similar reference numerals designate corresponding parts throughout it may be stated that the preferred embodiment of the machine comprises a frame composed of standards 21, 21 and a table portion 22 upon which is supported the operating and driving mechanism of the machine. The main shaft 23 is journaled transversely of the machine in the cross bars 24, 24, this shaft being driven by the pulley 25 from any suitable source of power, the shaft being thrown into and out of gear with said pulley by means of the clutch mechanism illustrated generally at 26 and operated by means of the lever 27 through the intermediary of the rock shaft 28 and link 29.

Upon the main shaft 23 are fixed a series of cams 30, 31, 32 and 33, the particular function of which will be hereafter set forth. This shaft has also keyed thereon a bevel gear 34 in mesh with a similar gear 35 fixed upon a counter shaft 36 journaled at one end in one of the cross bars 37 and at the other end in a bracket 38 carried by the other cross bar 37. Mounted upon the shaft 36 are cams 39, 40 and 41. This shaft carries also a toothed pinion 42 in mesh with a similar pinion 43 fixed upon a second counter shaft 44 for the driving of the latter shaft in its bearings in the cross bars 37, 37. The counter shafts 36 and 44 likewise respectively carry drive sprockets 45 and 46.

Referring particularly to Figs. 1, 5 and 13, it will be seen that at one end of the machine is arranged at an inclination of substantially 45 degrees a chute 47 within which the boxes 48 are placed with their lids in position but unsecured, these boxes being fed by gravity to the bottom of said chute into alinement with the arcuate passageway 49 formed between the spaced curved guides 50 and 51. At this point the boxes are engaged and carried forward into said passage one at a time intermittently by means of a feed shoe 52 upon the end of an arm 53 of a cam lever fulcrumed upon the rod 54 supported by the brackets 55, 55. The other arm 56 of said lever engages by means of a stud 57 within the cam groove 58 of the cam 30. At each revolution of the cam 30 the arm 53 with its shoe 52 is actuated between the positions indicated in full and dotted lines in Fig. 13 whereby the lowermost box in the chute 47 is moved forward a distance corresponding substantially to the width of said box where it is frictionally held beneath a leaf spring 59, and as the shoe recedes to the position shown in dotted lines the next box drops to a point where it will be engaged by the shoe in its next movement and moved forward pushing before it the preceding box. At the forward end of the curved passage 49 and transversely of said passage is arranged a carrier chain 60 having arranged thereon at intervals the engaging hooks 61. This chain 60 passes around and is driven by sprockets 62, 63 (see Figs. 4 and 5), the former sprocket 62 being carried by the short shaft 64 while the latter sprocket 63 is mounted upon the shaft 65 upon the opposite end of which is keyed another sprocket 66 which drives the shaft 65, being itself driven by sprocket chain 67 from the drive sprocket 46 on the counter shaft 44. The motion of the carrier chain 60 is a continuous one and the hooks 61 are so spaced that the boxes 48 are intermittently fed through the passage 49 to a position above said chain in advance of one of the hooks and by these hooks the boxes are carried forward, as shown in Fig. 5, in spaced relation to each other beneath the ductor roll 68 assembled in operative relation to a glue pot 69, the feed of the glue to the roll being regulated by means of an adjustment screw 70 by which the glue vessel is approached more or less closely to the said roll 68.

The ductor roll is provided at one end with a bearing recess in which engages the end of a spindle 71 provided with a handle 72 and inwardly pressed by a spring 73, while the other end of the ductor roll axle is provided with a clutch pin coupling engaged by similar clutch pins 74 carried by the end of a stub shaft 75 which carries a sprocket 76 driven by means of a sprocket chain 77 from the guide sprocket 45 previously referred to as carried by the counter shaft 36. In this way the ductor roll is continuously driven and the lower face thereof is caused to apply glue to the tops of boxes 48 as they are carried beneath said ductor roll by the hooks 61 of the chain 60.

Mounted above the table 22 upon a bracket 78 is a label magazine 79 comprising generally a fixed end wall 80, a fixed side wall 81, a fixed partial side wall 82 and an adjustable end wall 83 and side wall 84, the side wall 84 being pivotally mounted at 85 and yieldingly pressed against the superimposed labels 86 within the magazine. Upon the fixed side wall 81 of the magazine are arranged resilient bearing strips 87 against which the edges of the labels bear. Within the standards 88, 88 having horizontal arms 89, 89 is guided a rod 90 which carries at its lower end a follower plate comprising stepped portions 91, 92, which stepped portion 92 bears upon the stack of labels 86. Below the labels are marginally supported by lips 93, 94 and stud 95.

The magazine 79 is disposed above and in the vertical plane of the path of the carrier chain 60, and between the open bottom of the magazine and said chain are mounted a pair of spring dogs, the one 96 being pivoted at 97 to a bracket 98 and depending therefrom. The dog 96 has a cam face 99 merging in an upwardly facing shoulder 100. This dog is yieldingly pressed forward by a spring 101 mounted about the link pin 102 pivoted to the dog at 103 and guided within an opening 104 the limit of its forward movement being controlled by lock nuts 105. Opposed to the dog 96 is another dog 106 having a lower cam face 107 and an upwardly facing shoulder 108, the dog being pivoted at 109 and yieldingly supported in position by the spring 110 mounted upon the link pin 111 and having its forward movement limited by the lock nuts 112. While the cam faces of the two dogs are opposed one to the other the shoulders 100 and 108 are not in the same horizontal plane but the shoulder 100 occupies a position slightly above the shoulder 108 for a purpose to be hereafter explained.

Within the cam groove of the cam 32 travels a stud 113 carried by the arm 114 upon the upper extension 115 of which is mounted a cross head 116 and from this cross head, offset laterally with reference to the arm 114 and extension 115, arise four vertical standards 117, two on each side of the carrier chain 60 and between the opposed faces of the dogs 96 and 106 and in line with the open bottom of the magazine.

The vertical reciprocation of the cross head and standards by means of the cam 32 is so timed that at the instant one of the boxes 48 is brought by the chain 60 to a position in the path of said standard, it is lifted free from the hooks 61 upon the ends of the four standards 117 and carried upwardly between the two dogs, which are pressed to one side, until the opposite margins of its upper face contact with the presser feet 118, 119 of the two presser rods 120 and 121 guided upon opposite sides of the magazine in bearings 122 and yieldingly pressed downward by means of the coil springs 123 and 124. While the box is held firmly between the presser feet 118 and 119 above and the standards 117 below, it continues to travel upwardly against the tension of the springs 123, 124 until the adhesive upper face of the box contacts with one end of the lowermost label 86 which latter is caused to adhere to the box and as the movement is reversed and the box descends under the spring pressure of the presser feet 118, and 119 and following the standards 117 the lowermost label leaves the magazine and follows the box with its free end extending outwardly therefrom as shown most clearly in Figs. 5 and 9, the former figure showing the box in its uppermost position and the latter figure showing the same after its downward movement is stopped by contact with the shoulders 100 and 108 of the dogs 96 and 106.

The groove of the cam 31 is engaged by a stud 125 upon the arm 126 of a cam lever fulcrumed at 127 upon the rod 54, the other arm 128 of the lever having pivoted upon its upper end at 129 a hand 130. A spring 131 secured at 132 to the arm and at 133 to the hand, permits of yielding pivotal movement of the hand upon the arm which movement is limited by a pin 134 working in a slot 135. The hand 130 has upon its extremity two offset portions which may be termed respectively a thumb 136 and a finger 137. The shape of the groove in the cam 31 is such and the operation is so timed as to cause the hand 130 to be reciprocated horizontally at the precise moment that the box 48 with its affixed label reaches the position shown in Fig. 9, as previously referred to.

The construction and the operation of the mechanism just described is shown most clearly in Fig. 10, the hand moving from the position shown in full lines to that shown in dotted lines in said figure, and pushing the box with its label along a track, the two rails 138, 139 of which form a substantial continuation of the shoulders 100 and 108, that rail on the side opposite the overhanging label being at a greater elevation so as to carry the box in a tilted position as indicated in Fig. 9 with the label extending horizontally and supported by a guide 140.

In its passage from beneath the magazine and while in its tilted position the box passes beneath a pair of pressure rolls 141, 142 which rolls are preferably made of sponge rubber and journaled in a weighted frame 143 pivoted at 144 in order to be swung upwardly into an inoperative position to afford access to the parts thereunder. The function of these rolls is to smooth the label upon the top of the box to prevent any air bubbles thereunder and to cause the same to adhere firmly. At this point also the overhanging end of the label 86 is caused to pass over a ductor roll 145 adjustably positioned within the glue pot 146 by means of the adjusting screw 147, the glue pot being removably held in position by the engagement in its perforated lug 148 of the conical end of a screw spindle 149 having a hand wheel 150. Stripper blades 151 prevent the label, as it is applied to the surface of the ductor roll beneath a pressure plate 152 controlled by a set screw 153, from adhering to said roll and traveling around the same. As the overhanging portion of the label, when passing over the ductor roll, occupies a position at an angle to the upper face of the box, the glue is readily applied to said label close up to the corner of the box and it is for this reason primarily that the box is carried in a tilted position at this point. The ductor roll 145 is journaled at one end in the side of the glue pot and at the other end has a clutch pin connection 154 with the shaft 155 which carries a sprocket 156 driven by the chain 157 from the drive sprocket 158 on the main shaft 23 which chain 157 is acted upon by idlers 159, 160, and 161, the chain also passing about a sprocket 162 the function of which will be hereafter disclosed.

As the box with the label affixed to its top at one end and with the overhanging portion supplied with adhesive passes from the position shown in Figs. 2, 4 and 15 to the position shown in the bottom portion of Fig. 16, the overhanging label is supported by a knife-edge guide 163 and the box assumes a horizontal position as shown in said figure. The boxes are transported along the guides 138 and 139, after leaving the magazine under the influence of the hand 130, by means of a carrier chain 164 provided with hooks 165 and otherwise practically identical with the carrier chain 160. This chain passes over the sprocket 166 mounted upon the stub shaft 167 and over the sprocket 168 mounted upon the shaft 169 which latter shaft is driven continuously by means of the sprocket 162 and the chain 157 previously described. A groove 170 of the cam 40 is engaged by a stud 171 carried by the cam rod 172 the lower bifurcated end of which is guided upon the counter shaft 36 and the upper end within a socket 173 whereby the cam rod 172 with its cross head 174 and the upwardly extending standards 175 are vertically reciprocated in a plane transversely of the path of the chain 164, being guided within apertures 176, 176 of the table 22. Upon the top of the table on that side of the chain 164 opposite the knife-edge guide 163 is fixed a bracket 177 which is spaced from the guide 163 a distance corresponding to the width of the box 48 and extends to a greater height than the said guide. Upon the opposite side of the chain from the bracket 177 and above the guide 163 is disposed a block 178, the inner face 179 of which is opposed to the inner face of the bracket 177 and at a distance therefrom corresponding to the width of the box. A brush 180 is let into the inner face of the block 178.

The vertical reciprocation of the cross head 174 and the standards 175 is so timed that when a box is brought by the chain 164 to a position in line with the standards 175 the latter engage beneath the box and lift the same through the passageway formed between the bracket 177 and the brush 180 causing the overhanging portion of the label 86 to be bent downwardly across the edge of the box and pressed into intimate contact with the same by the brush 180 as shown in Fig. 11. Thereupon the cross head 174 and standards 175 descend to the position shown in Fig. 12 ready to receive the next box.

The cam 39 engages by its groove 181 the stud 182 carried by one arm 183 of a cam lever fulcrumed upon the shaft 44, the other arm 184 of the lever carrying on its upper end a hand 185 extending horizontally therefrom and movable with said lever transversely of the space between the bracket 177 and the block 178 and immediately above the upper surface of said block. The operation of the cam is so timed that the hand 185 moves from position shown in Fig. 11 to that shown in Fig. 12 just as the standards 175 reach the upper limit of their travel and at which instant the bottom of the box 48 occupies a position, as shown in Fig. 11, coincident with the upper face of the block 178. The movement of the hand 185 serves to push the box off the upper ends of the standards 175 into the confined horizontal space 186 between the upper face of the block 178 and the lower face of the overlying block 187. By this operation that portion of the label which extends below the edge of the box is bent horizontally beneath the box by the upper corner of the block 178 so that it covers the bottom of the box. As the boxes are progressively pushed through the space 186 the label is pressed upon the upper face of the box by the brush 188 carried by the block 187 and is pressed upon the bottom of the box by the brush 189 which is mounted within the upper face of the block 178.

In order to facilitate the cleaning and inspection of the machine the block 187 is pivotally mounted at 190 so that it can be swung upwardly out of the way while the block 178 is removably secured to the bracket 191 by means of a screw 192.

The groove of the cam 33 is engaged by a stud 193 of the cam rod 194, the lower bifurcated end of which is guided upon the two sides of the shaft 23, the upper end of the cam rod 194 being pivoted at 195 to an arm 196 of a rock shaft 197 and upon the opposite end of the shaft 197 is secured a wiper arm 198. The mounting of the rock shaft 197 is such that the arm 198 moves in a vertical plane which coincides with the axis of the horizontal discharge trough 199 at the end of and immediately below the terminus of the passage 186, one wall 191ª of the chute being an extension of the bracket 191.

As each box is pushed from the passage 186 it is frictionally supported between the edge of the bracket 191 and a leaf spring 200 and while held in this position is caught by the wiper arm 198 and swung from a horizontal to a vertical position at the entrance to the discharge chute 199 with its bottom bearing against the top of the preceding box and with its edge which is covered by the label bearing outwardly against a plate 201 resiliently mounted by means of springs 202, 202 on the screws 203, 203. As each successive box emerges from the passage 186 and is deposited by the wiper arm 198 in the chute 199 it serves to move the preceding boxes progressively onward through said chute with the label bearing edge in contact with the bristles of a brush 204, which is mounted at the side of the chute as shown in Fig. 2, whereby the label is pressed into intimate contact with the edge of the box.

The cam 41 is engaged by the stud 205 of a cam arm 206 fixed upon a rock shaft 207 journaled at 208 and upon the end of the rock shaft 207 is adjustably mounted by means of set screws 209 a frame 210 bearing a plate 211 having a face 212 of sponge rubber arranged substantially in the plane of the bristles of the brush 204. The conformation of the cam 41 is such as to impart to the shaft 207 an irregular rocking motion and to the rubber plate 212 a vibratory movement by which the labels covering the edges of the box are further intimately pressed thereon by a patting action simulating that of the human hand. After passing the rubber plate 212 the boxes are discharged from the machine with their labels completely and securely affixed.

In order that the application of the glue to the top of the box shall be confined to the central area leaving a narrow margin free therefrom, I limit the feed of the glue to a portion only of the periphery of the roll 68 and provide for the accurate regulation of the feed as follows: As will be seen from Figs. 5 and 5ª the glue pot 69 is hingedly connected at 213 to the bracket 214 in the arms 215 of which the roll 68 is journaled. On the axle 216 of the roll between the roll and each of its bearings in the arms 215 is arranged a cam 217, and above in the plane of each cam is a plate 218 adjustably spaced from the extension 69ª of the pot 69 by means of the set screw 219. By means of the adjusting screws 70 the lower forward edge 69ᵇ of the glue pot is pushed forward into such spaced relation to the roll 68 as to permit a certain amount of glue to be carried from the pot on the roll and transferred to the box. This condition applies during the rotation of the roll through an arc corresponding in width to the area to be coated, and thereupon the cam 217 contacts with the plate 218 and lifts the extension 69ª to an extent determined by the set screw 219, bringing the lip 69ᵇ of the pot closely into contact with the roll so as to prevent any glue leaving the pot on the roll during the engagement of the cam with the plate, which corresponds with the interval between the successive boxes passing beneath the glue roll.

While I have described with a considerable degree of particularity one practical embodiment of the invention as adapted to the affixing of paper labels to the two sides and one edge of cigarette boxes, it is to be understood that the invention is not restricted to the particular embodiment and the constructional details thus illustrated and described by way of example.

Obviously the invention is adapted to the applying of labels to objects other than boxes, and the interrelation and conformation of the working parts are subject to modification within wide ranges to meet the requirements of different kinds of service without departure from the invention or sacrificing its material advantages. It will also be understood that the terms glue, paste and adhesive are used interchangeably in the specification and claims and not in a generic and specific sense, as the mechanism disclosed is equally well suited to the application of labels to boxes whatever the adhesive medium employed. Likewise terms of direction as used in defining the location of parts and direction of movement such as upwardly, below, forwardly, etc., are not to be taken in an unnecessarily limiting sense but as referring to the particular embodiment of the invention illustrated.

I claim—

1. In a labeling machine, the combination of a label magazine, a box-carrier traveling adjacent said magazine, means to apply adhesive to the box, and means to move the box from the carrier and against one of the labels in the magazine, substantially as described.

2. In a labeling machine, the combination of a label magazine having an open bottom, a box-carrier traveling beneath said magazine, means to apply adhesive to the box, and means to elevate the box from the carrier to bring the coated side thereof against one of the labels in the magazine, substantially as described.

3. In a labeling machine, the combination of a label magazine having an open bottom, a box-carrier traveling beneath said magazine, means to apply adhesive to the box while on said carrier, and means to move the box from said carrier and press it against one of the labels in the magazine, substantially as described.

4. In a labeling machine, the combination of a label magazine, a paste roller, a box-carrier traveling adjacent the magazine and paste roller to bring the box in contact with the paste roller and means to remove the box from the carrier into contact with one of the labels in the magazine, substantially as described.

5. In a labeling machine, the combination of a label magazine open below, a paste roller, a box-carrier traveling in succession beneath the paste roller and magazine whereby to bring a box into contact with the paste roller and to a position beneath the magazine, and means to lift the box from said carrier and press it against one of the labels in the magazine, substantially as described.

6. In a labeling machine, the combination of a label magazine having an open bottom, a box-carrier traveling beneath said magazine, means to apply adhesive to the box while on said carrier, means to move the box from said carrier and press it against one of the labels in the magazine, a second carrier, and means to smooth the label upon the box after leaving the magazine, substantially as described.

7. In a labeling machine, the combination of a label magazine having an open bottom, a box-carrier traveling beneath said magazine, means to apply adhesive to the box while on said carrier, means to move the box from said carrier and press it against one of the labels in the magazine, a second carrier, means to move the box and affixed label on to the second carrier, and yielding means to smooth the label upon the box after leaving the magazine and while being transported to the second carrier, substantially as described.

8. In a labeling machine, the combination of a label magazine having an open bottom, a box-carrier traveling beneath said magazine, means to apply adhesive to the box while on said carrier, means to move the box from said carrier and press it against one of the labels in the magazine, a smoothing roller, a second carrier arranged to receive the box and affixed label from the magazine and to carry the same beneath the smoothing roller whereby to press the label upon the box, substantially as described.

9. In a labeling machine, the combination of a label magazine having an open bottom, a box-carrier traveling beneath said magazine, means to apply adhesive to the box while on said carrier, means to move the box from said carrier and press it against one of the labels in the magazine, a pair of sponge rubber gravity smoothing rollers, and a second carrier arranged to receive the box and label from the magazine and to carry the same beneath the smoothing rollers whereby to press the label upon the box, substantially as described.

10. In a labeling machine, the combination of a label magazine having an open bottom, a paste roller, a box-carrier traveling successively beneath the paste roller and magazine whereby to coat the box with adhesive and then position the same beneath the label magazine, means to lift the box from the carrier and press it against one of the labels in the magazine, a sponge rubber gravity roller, and a second carrier arranged to transport the box and affixed label from the magazine beneath the gravity roller whereby to press the label firmly upon the box, substantially as described.

11. In a labeling machine, the combination of a label magazine, a box-carrier traveling adjacent said magazine, means to apply adhesive to the box, means to move the box laterally and press it against one end of one of the labels in the magazine, a second carrier, yielding means to smooth the affixed end of the label upon the box, means to apply adhesive to the free portion of the label, and means to fold the coated free portion of the label over another side of the box, substantially as described.

12. In a labeling machine, the combination of a label magazine, a box-carrier traveling adjacent said magazine, means to apply adhesive to the box, means to move the box laterally and press it against one end of one of the labels in the magazine, a second carrier, means to apply adhesive to the free portion of the label, means to fold the coated free portion of the label over the edge of the box and over the other side of the box, and means bearing against the edge and sides of the box to smooth the label thereon, substantially as described.

13. In a labeling machine, the combination of a label magazine, a box-carrier traveling adjacent said magazine, means to apply adhesive to the box, means to move the box laterally and press it against one end of one of the labels in the magazine, a yielding smoothing roller, a second paste roller, a second carrier arranged to transport the box and label from the magazine to bring the box and affixed portion of the label beneath the smoothing roller and the free portion of the label in contact with the second paste roller, means to fold the coated label over another side of the box, and means to smooth the label upon said other side of the box, substantially as described.

14. In a labeling machine, the combination of a label magazine having an open bottom, a paste roller, a box-carrier traveling beneath the paste roller and magazine whereby to coat the box with adhesive and position the same beneath the magazine, means to move the box laterally from said carrier and press it against one end of one of the labels in the magazine, a second carrier, yielding means to smooth the affixed end of the label upon the box, means to apply adhesive to the free portion of the label, and means to fold the coated free portion of the label over another side of the box, substantially as described.

15. In a labeling machine, the combination of a label magazine having an open bottom, a paste roller, a box-carrier traveling beneath the paste roller and magazine whereby to coat the box with adhesive and position the same beneath the magazine, means to move the box laterally from said carrier and press it against one end of one of the labels in the magazine, a second carrier, means to apply adhesive to the free portion of the label, means to fold the coated free portion of the label over the edge of the box and over the other side of the box, and means bearing against the edge and sides of the box to smooth the label thereon, substantially as described.

16. In a labeling machine, the combination of a label magazine having an open bottom, a paste roller, a box-carrier traveling beneath the paste roller and magazine whereby to coat the box with adhesive and position the same beneath the magazine, means to move the box laterally from said carrier and press it against one end of one of the labels in the magazine, a yielding smoothing roller, a second paste roller, a second carrier arranged to transport the box and label from the magazine to bring the box and affixed portion of the label beneath the smoothing roller and the free portion of the label in contact with the second paste roller, means to fold the coated label over another side of the box, and means to smooth the label upon said other side of the box, substantially as described.

17. In a labeling machine, the combination of a label magazine having an open bottom, a paste roller, a box-carrier comprising a chain provided at intervals with box engaging hooks and traveling beneath the paste roller and magazine, means to feed boxes to said carrier, means to drive said chain whereby the boxes are brought into contact with the paste roller and into a position beneath the open box of the magazine, an elevating device to lift the box from the carrier to bring its coated side in contact with one of the labels in the magazine, and means to remove the box and label from the elevating device, substantially as described.

18. In a labeling machine, the combination of a label magazine having an open bottom, a paste roller, a box-carrier comprising a chain provided at intervals with box engaging hooks and traveling beneath the paste roller and magazine, means to feed boxes to said carrier, means to drive said chain whereby the boxes are brought into contact with the paste roller and chain to a position beneath the open box of the magazine, an elevating device to lift the box from the carrier to bring its coated side in contact with one of the labels in the magazine, means to remove the box and label from the elevating device, a smoothing roller, a second box carrier comprising a chain and box engaging hooks arranged to receive the box from the elevating device and to carry the same beneath the smoothing roller, substantially as described.

19. In a labeling machine, the combination of a label magazine having an open bottom, a paste roller, a box-carrier comprising a chain provided with box engaging hooks traveling beneath the paste roller and magazine, means to feed boxes to said carrier, means to drive the carrier whereby to bring the box successively in contact with the paste roller and to a position beneath the open bottom of the magazine, an elevating device arranged to lift the box from the carrier and press the same against one end of one of the labels in the magazine, a second paste roller, a second carrier provided with box engaging hooks and traveling adjacent the second paste roller, means to remove the box and label from the magazine on to the second carrier, means to drive the second carrier to bring the free portion of the label into contact with the second paste roller, means to fold the coated free portion of the label over another side of the box, and means bearing upon the affixed label to smooth the same, substantially as described.

20. In a labeling machine, the combination of a label magazine having an open bottom, a paste roller, a box-carrier comprising a chain provided with box engaging hooks traveling beneath the paste roller and magazine, means to feed boxes to said carrier, means to drive the carrier whereby to bring the box successively in contact with the paste roller and to a position beneath the open bottom of the magazine, an elevating device arranged to lift the box from the carrier and press the same against one end of one of the labels in the magazine, a soft rubber pressure roller, a second paste roller arranged along side the pressure roller, a second carrier comprising a chain provided with box engaging hooks traveling beneath the pressure roller at the side of the second paste roller, means to remove the box with its label from the elevating device on to the second carrier, means to drive the second carrier to bring the box under the pressure roller and the free portion of the label into contact with the second paste roller, means to fold the coated free portion of the label over the edge and the other side of the box, and means bearing against the affixed label to smooth the same, substantially as described.

21. In a labeling machine, the combination of a label magazine having an open bottom, a paste roller, a box-carrier comprising a chain provided with box engaging hooks traveling beneath the paste roller and magazine, means to feed boxes to said carrier, means to drive the carrier whereby to bring the box successively in contact with the paste roller and to a position beneath the open bottom of the magazine, an elevating device arranged to lift the box from the carrier and press the same against one end of one of the labels in the magazine, a soft rubber pressure roller, a second paste roller arranged along side the pressure roller, a second carrier comprising a chain provided with box engaging hooks traveling beneath the pressure roller at the side of the second paste roller, means to remove the box with its label from the elevating device on to the second carrier, means to drive the second carrier to bring the box under the pressure roller and the free portion of the label into contact with the second paste roller, a frame work providing a passage therethrough, means to move the box and label across the lip of said frame into the open mouth of the passage whereby to fold the free portion of the label over the edge and the other side of the box, and means to push the box through said passage in contact with the walls thereof to press the label into intimate contact with the box, substantially as described.

22. In a labeling machine, the combination of a label magazine having an open bottom, a paste roller, a box-carrier comprising a chain provided with box engaging hooks traveling beneath the paste roller and magazine, means to feed boxes to said carrier, means to drive the carrier whereby to bring the box successively in contact with the paste roller and to a position beneath the open bottom of the magazine, an elevating device arranged to lift the box from the carrier and press the same against one end of one of the labels in the magazine, a soft rubber pressure roller, a second paste roller arranged along side the pressure roller, a second carrier comprising a chain provided with box engaging hooks traveling beneath the pressure roller at the side of the second paste roller, means to remove the box with its label from the elevating device on to the second carrier, means to drive the second carrier to bring the box under the pressure roller and the free portion of the label into contact with the second paste roller, a frame work providing a passage therethrough, means to move the box and label across the lip of said frame into the open mouth of the passage whereby to fold the free portion of the label over the edge and the other side of the box, means to push the box through said passage in contact with the walls thereof to press the label into intimate contact with the box, a discharge chute arranged at the outlet from the passage, means to remove the boxes from the outlet of the passage into the discharge chute and to move the same progressively through said chute in contact one with another, and yielding means bearing upon the edges of the boxes to press the labels into intimate contact with the box edges, substantially as described.

23. In a labeling machine, the combination of a label magazine having an open bottom, a paste roller, a box-carrier comprising a chain provided with box engaging hooks traveling beneath the paste roller and magazine, means to feed boxes to said carrier, means to drive the carrier whereby to bring the box successively in contact with the paste roller and to a position beneath the open bottom of the magazine, an elevating device arranged to lift the box from the carrier and press the same against one end of one of the labels in the magazine, a soft rubber pressure roller, a second paste roller arranged along side the pressure roller, a second carrier comprising a chain provided with box engaging hooks traveling beneath the pressure roller at the side of the second paste roller, means to remove the box with its label from the elevating device on to the second carrier, means to drive the second carrier to bring the box under the pressure roller and the free portion of the label into contact with the second paste roller, a frame work providing a passage therethrough, means to move the box and label across the lip of said frame into the open mouth of the passage whereby to fold the free portion of the label over the edge and the other side of the box, means to push the box through said passage in contact with the walls thereof to press the label into intimate contact with the box, a discharge chute arranged at the outlet from the passage, means to receive the boxes from the passage and push the same one by one into the chute and to cause the same to travel therethrough one against the other, and yielding vibratory means acting upon the box edges to press the labels into intimate contact, substantially as described.

24. In a labeling machine, the combination of a label magazine having an open bottom, a paste roller, a box-carrier comprising a chain provided with box engaging hooks traveling beneath the paste roller and magazine, means to feed boxes to said carrier, means to drive the carrier whereby to bring the box successively in contact with the paste roller and to a position beneath the open bottom of the magazine, an elevating device arranged to lift the box from the carrier and press the same against one end of one of the labels in the magazine, a soft rubber pressure roller, a second paste roller arranged along side the pressure roller, a second carrier comprising a chain provided with box engaging hooks traveling beneath the pressure roller at the side of the second paste roller, means to remove the box with its label from the elevating device on to the second carrier, means to drive the second carrier to bring the box under the pressure roller and the free portion of the label into contact with the second paste roller, a frame work providing a passage therethrough, means to move the box and label across the lip of said frame into the open mouth of the passage whereby to fold the free portion of the label over the edge and the other side of the box, means to push the box through said passage in contact with the walls thereof, a discharge chute arranged at the outlet from the passage, means to remove the boxes from the outlet of the passage into the discharge chute and to move the same progressively through said chute in contact one with another, yielding means bearing upon the edges of the boxes to press the labels into intimate contact with the box edges, and a vibratory plate having a face of sponge rubber arranged to contact with the edges of the boxes to additionally press the labels thereon, substantially as described.

25. In a labeling machine, the combination with a box-carrier and means to apply adhesive to the box, of a label magazine arranged above the carrier and having an open bottom, a pair of dogs yieldingly mounted between the carrier and the magazine and having upwardly facing shoulders, an elevating device arranged to lift the coated box from the carrier and pass the same between the yielding dogs into contact with a label, the shoulders arranged to engage the box and free the same from the elevating device, a second carrier arranged at substantially the elevation of the shoulders, and means to remove the box and label from the shoulders onto the second carrier, substantially as described.

26. In a labeling machine, the combination with a box-carrier and means to apply adhesive to the box, of a label magazine arranged above the carrier and having an open bottom, a pair of dogs yieldingly mounted between the carrier and the magazine and having upwardly facing shoulders, an elevating device arranged to lift the coated box from the carrier and pass the same between the yielding dogs into contact with a label, spring pressed means to cause the return of the box and label with the elevating device to the shoulders of the dogs, a second box carrier traveling in substantially the plane of the shoulders, and means to remove the box and label from the shoulders on to the second carrier, substantially as described.

27. In a labeling machine, the combination with a box-carrier and means to apply adhesive to the box, of a label magazine arranged above the carrier and having an open bottom, a pair of dogs yieldingly mounted between the carrier and the magazine and having upwardly facing shoulders, a pair of yieldingly mounted presser feet arranged adjacent the shoulders, an elevating device operating transversely of the carrier to lift a box therefrom and pass same between the yielding dogs against the presser feet and with the latter upward until the coated box contacts with the label within the magazine, the presser feet causing the box to follow the return movement of the elevating device until it is engaged by the shoulders of the dogs, and means to remove the box laterally from the shoulders, substantially as described.

28. In a labeling machine, the combination with a box-carrier and means to apply adhesive to the box, of a label magazine arranged above the carrier and having an open bottom, a pair of dogs yieldingly mounted between the carrier and the magazine and having upwardly facing shoulders, a pair of yieldingly mounted presser feet arranged adjacent the shoulders, an elevating device operating transversely of the carrier to lift a box therefrom and pass same between the yielding dogs against the presser feet and with the latter upward until the coated box contacts with the label within the magazine, the presser feet causing the box to follow the return movement of the elevating device until it is engaged by the shoulders of the dogs, a pressure roller, a second carrier traveling in substantially the plane of the shoulders and beneath the pressure roller, and means to remove the box from the shoulders on to the second carrier whereby the same is transported beneath the pressure roller to smooth the label upon the box, substantially as described.

29. In a labeling machine, the combination with a box-carrier, of a label magazine arranged above the carrier and having an open bottom, a pair of dogs yieldingly mounted between the carrier and the magazine and having upwardly facing shoulders, an elevating device arranged to lift the box from the carrier and pass the same between the yielding dogs into contact with a label, the shoulders arranged to engage the box and free the same from the elevating device, a second carrier arranged at substantially the elevation of the shoulders, and means to remove the box and label from the shoulders onto the second carrier, substantially as described.

30. In a labeling machine, the combination with a box-carrier, of a label magazine arranged above the carrier and having an open bottom, a pair of dogs yieldingly mounted between the carrier and the magazine and having upwardly facing shoulders, an elevating device arranged to lift the box from the carrier and pass the same between the yielding dogs into contact with a label, spring pressed means to cause the return of the box and label with the elevating device to the shoulders of the dogs, a second box-carrier traveling in substantially the plane of the shoulders, and means to remove the box and label from the shoulders on to the second carrier, substantially as described.

31. In a labeling machine, the combination with a box-carrier, of a label magazine arranged above the carrier and having an open bottom, a pair of dogs yieldingly mounted between the carrier and the magazine and having upwardly facing shoulders, a pair of yieldingly mounted presser feet arranged adjacent the shoulders, an elevating device operating transversely of the carrier to lift a box therefrom and pass same between the yielding dogs against the presser feet and with the latter upward until the box contacts with the label within the magazine, the presser feet causing the box to follow the return movement of the elevating device until it is engaged by the shoulders of the dogs, and means to remove the box laterally from the shoulders, substantially as described.

32. In a labeling machine, the combination with a box-carrier, of a label magazine arranged above the carrier and having an open bottom, a pair of dogs yieldingly mounted between the carrier and the magazine and having upwardly facing shoulders, a pair of yieldingly mounted presser feet arranged adjacent the shoulders, an elevating device operating transversely of the carrier to lift a box therefrom and pass same between the yielding dogs against the presser feet and with the latter upward until the box contacts with the label within the magazine, the presser feet causing the box to follow the return movement of the elevating device until it is engaged by the shoulders of the dogs, a pressure roller, a second carrier traveling in substantially the plane of the shoulders and beneath the pressure roller, and means to remove the box from the shoulders on to the second carrier whereby the same is transported beneath the pressure roller to smooth the label upon the box, substantially as described.

33. In a labeling machine, the combination of a paste reservoir, a support therefor, a roller mounted in the support and rotating in juxtaposition to a lower open side of the reservoir, a box-carrier traveling beneath the roller to carry the boxes successively into contact with the roller, a label magazine, and means to remove the boxes from the carrier and press the same successively against one of the labels in the magazine, substantially as described.

34. In a labeling machine, the combination of a paste reservoir, a support therefor, a roller mounted in the support and rotating in juxtaposition to a lower open side of the reservoir, means to adjust the reservoir toward and from the roller to regulate the amount of adhesive carried therefrom by the roller, a box-carrier traveling beneath the roller to carry the boxes into contact with the roller, a label magazine, and means to remove the coated boxes in succession from the carrier and press the same against one of the labels in the magazine, substantially as described.

35. In a labeling machine, the combination of a label magazine, a paste roller, a box-carrier traveling beneath the paste roller adjacent the magazine whereby to coat the box with adhesive and position the same with reference to the magazine, means to move the box from said carrier and press it against one end of one of the labels in the magazine, a smoothing roller, a paste reservoir, a second paste roller rotating in contact with the adhesive in said reservoir, a second box-carrier arranged to transport the box and label from the magazine to bring the box and affixed portion of the label beneath the smoothing roller and the free portion of the label in contact with the upper face of the second paste roller, means to prevent adhesion of the free portion of the label to the roller, means to fold the coated label over another side of the box, and means to smooth the label upon said other side of the box, substantially as described.

36. In a labeling machine, the combination of a label magazine, a paste roller, a box-carrier traveling beneath the paste roller adjacent the magazine whereby to coat the box with adhesive and position the same with reference to the magazine, means to move the box from said carrier and press it against one end of one of the labels in the magazine, a smoothing roller, a paste reservoir, a second paste roller rotating in contact with the adhesive in said reservoir, regulable means to remove the surplus adhesive from the roller, a second box-carrier arranged to transport the box and label from the magazine to bring the box and affixed portion of the label beneath the smoothing roller and the free portion of the label in contact with the upper face of the second paste roller, means to prevent adhesion of the free portion of the label to the roller comprising stripper arms arranged to engage beneath the advancing edge of the label, means to fold the coated label over another side of the box, and means to smooth the label upon said other side of the box, substantially as described.

37. In a labeling machine, the combination of a label magazine, a paste roller, a box-carrier traveling beneath the paste roller adjacent the magazine whereby to coat the box with adhesive and position the same with reference to the magazine, means to move the box from said carrier and press it against one end of one of the labels in the magazine, a smoothing roller, a paste reservoir, a second paste roller rotating in contact with the adhesive in said reservoir, regulable means to remove the surplus adhesive from the roller, a second box-carrier arranged to transport the box and label from the magazine to bring the box and affixed portion of the label beneath the smoothing roller and the free portion of the label in contact with the upper face of the second paste roller, means to prevent adhesion of the free portion of the label to the roller, said means comprising the provision upon the roller surface of circumferential grooves and stripper arms having their edges projecting into said grooves beneath the periphery of the roller so as to engage beneath the advancing edge of the label, a frame work providing therethrough a closed passage, and means to move the box and label from the second carrier across the edge of the frame and through the passage to fold the free portion of the label around the box and to press the same into intimate contact, substantially as described.

38. In a labeling machine, the combination of a chain provided at intervals with box engaging hooks, means to supply boxes to the chain, a label supply, and means to move each box in succession from the chain and against one of the labels to cause the label to adhere to the box, substantially as described.

39. In a labeling machine, a carrier chain provided at intervals with box engaging hooks, means to supply boxes to the chain, means to drive the chain, a label magazine, and means to move each box in succession from the chain and against one of the labels in the magazine to cause the label to adhere to the box, a second similar box carrying chain, means to transfer the boxes with affixed labels to the second chain, and a box discharge chute, substantially as described.

40. In a labeling machine, the combination of a carrier chain provided at intervals with box engaging hooks, means to supply boxes to the chain, means to drive the chain, a label magazine, means to move each box in succession from the chain against one end of one of the labels to cause one end of the label to adhere to the box, a second similar box carrier chain, means to transfer the boxes with affixed labels to the second chain, a frame inclosing a passage, means to move each of the boxes in succession across the edge of the frame and through the passage to fold the free end of the label around the box and cause the same to adhere thereto, and a box discharge chute, substantially as described.

41. In a labeling machine, the combination of magazines for articles to be applied one to another, an adhesive applying mechanism comprising a paste reservoir having a lip, a roller journaled to rotate adjacent the lip, means to effect relative adjustment of the reservoir and roller toward and from one another, means to temporarily vary the distance between the lip and roller during a certain part of its period of rotation, and means to carry the articles to be pasted in succession into operative relation to the adhesive roller and then into operative relation to the articles to which they are to be applied, substantially as described.

42. In a labeling machine, the combination of magazines for articles to be applied one to another, an adhesive applying mechanism comprising a paste reservoir pivotally mounted in a suitable support, a roller journaled in the support to rotate adjacent the open mouth of the reservoir, means to adjust the reservoir in a right line to and from the roller, means carried by the roller to tip the reservoir to move its mouth in an arcuate line to and from the roller to regulate the inner space between the open mouth of the reservoir and the rollers, and means to carry the articles to be pasted in succession into operative relation to the adhesive roller and then into operative relation to the articles to which they are to be applied, substantially as described.

43. In a labeling machine, the combination of a label supply, a box supply, an adhesive applying mechanism comprising a paste reservoir having a lip, a roller journaled to rotate adjacent the lip, means to effect relative adjustment of the reservoir and roller toward and from one another, means to temporarily vary the distance between the lip and roller during a certain part of its period of rotation, means to carry the boxes to be pasted in succession into operative relation to the adhesive roller and then into operative relation to the labels, and means to apply one to the other, substantially as described.

44. In a labeling machine, the combination of a label supply, a box supply, an adhesive applying mechanism comprising a paste reservoir having a lip, a roller journaled to rotate adjacent the lip, means to effect relative adjustment of the reservoir and roller toward and from one another, means actuated by the rotation of the roller to temporarily vary the distance between the lip and roller during a certain part of its period of rotation, means to carry the boxes to be pasted successively into operative relation to the adhesive roller, and then into operative relation to the labels, and means to press the pasted box against the stack of labels, substantially as described.

45. In a box labeling machine, the combination of means to apply a portion of a label to a box and leave an overhanging free label portion, means to fold said free label portion at an inclination to the pasted portion and at an obtuse angle to the unpasted box face, and paste-applying means operating within such obtuse angle, substantially as described.

46. In a box labeling machine, the combination of means to apply a portion of a label to a box and leave another portion of the label extending obliquely therefrom, a paste-applying device, and means to move the partially labeled box adjacent the paste-applying device with the latter within the obtuse angle between the unlabeled face of the box and the free label portion, whereby to apply paste to the said label portion close up to the box, substantially as described.

47. In a box labeling machine, the combination of means to apply a portion of a label to a box and leave an overhanging free portion, a paste roller, and means to move the box with its unlabeled face alongside the paste roller and with the free label portion overlying the roller at an upward inclination, whereby to apply paste to the underside of the free label portion close up to its junction with the box, substantially as described.

MICHAEL J. MILMOE.

Witnesses:
F. D. REDINGTON,
FRED G. BROOKS.